Feb. 20, 1940. W. J. PLEWS 2,190,949
EXPLODED CEREAL
Filed March 21, 1938 2 Sheets—Sheet 2
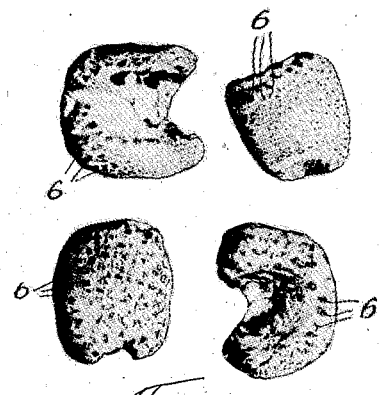
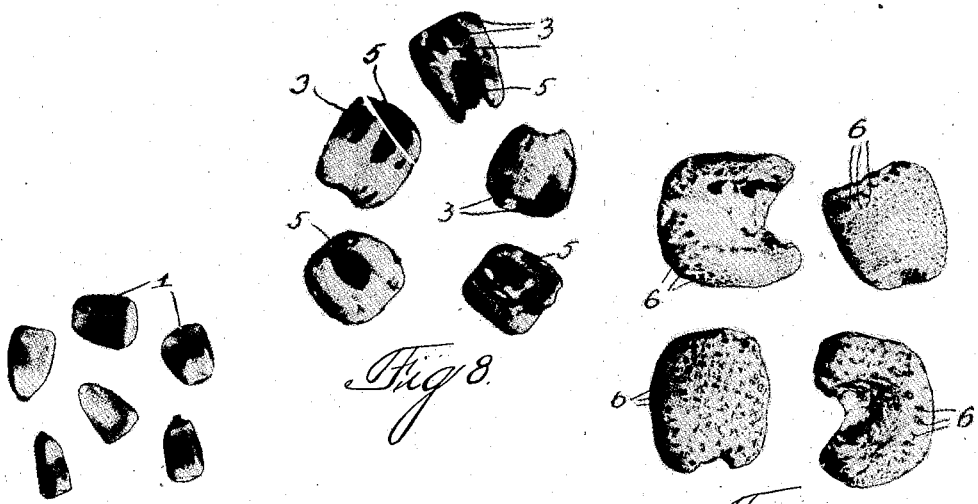
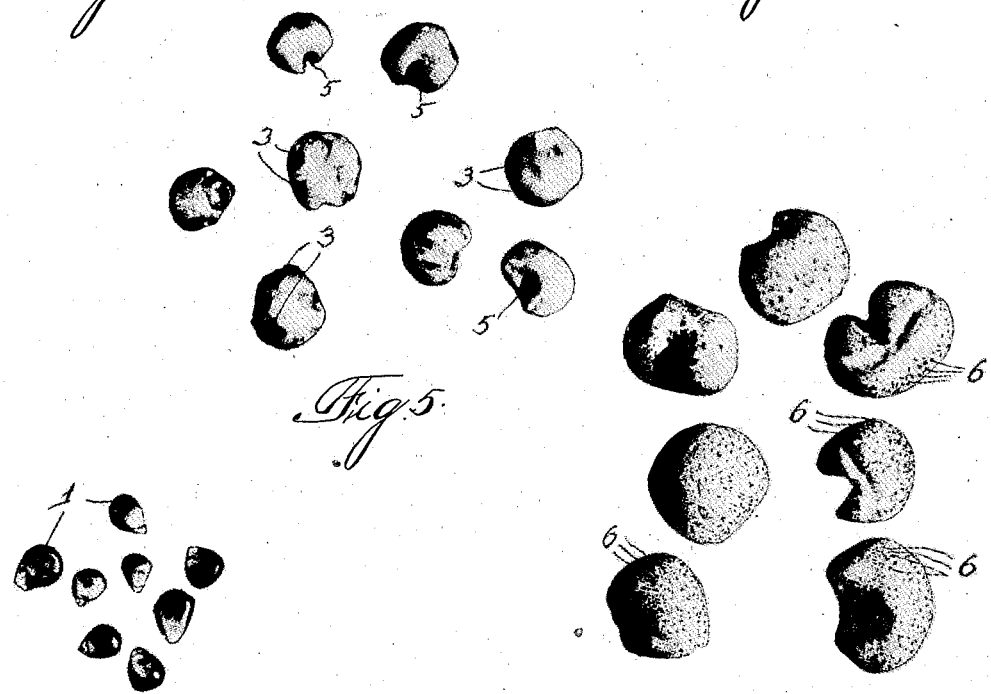

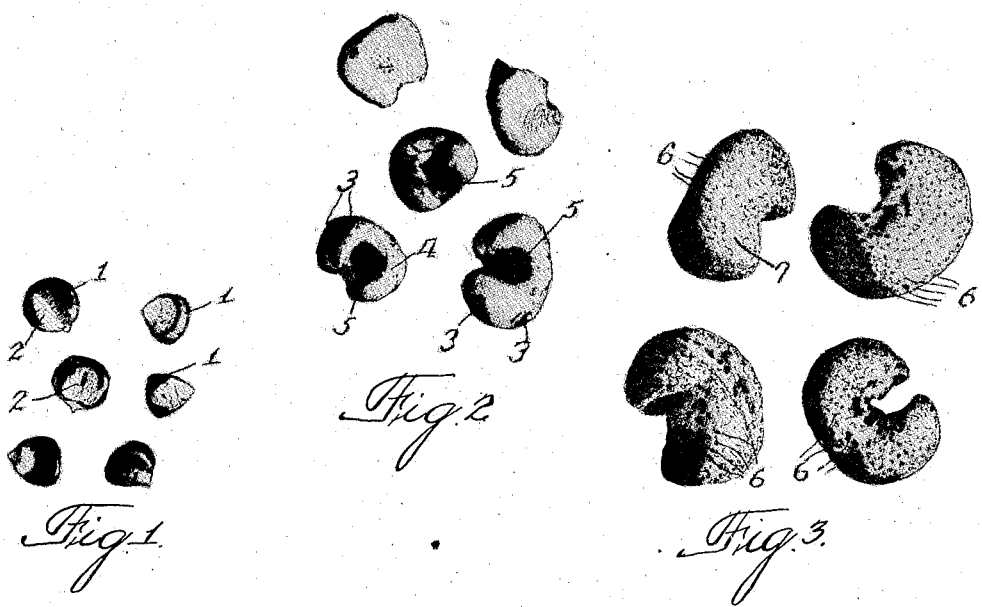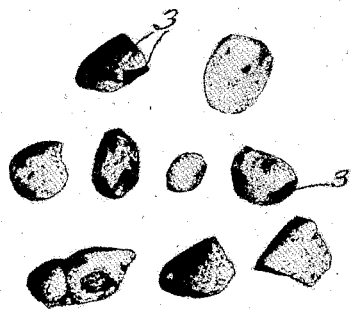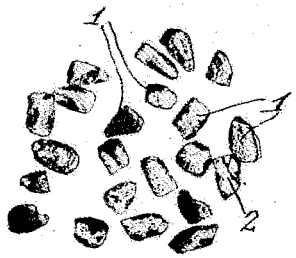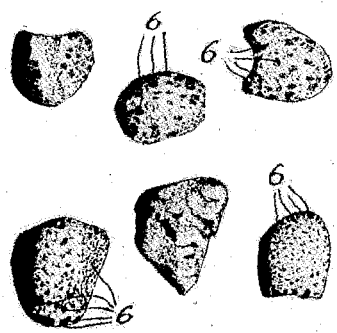

Patented Feb. 20, 1940

2,190,949

UNITED STATES PATENT OFFICE 2,190,949

EXPLODED CEREAL

William J. Plews, Chicago, Ill., assignor to Plews Processes, Inc., a corporation of New York Application March 21, 1938, Serial No. 197,203

10 Claims. (Cl. 99—82)

The present invention relates to expanded cereals, and more particularly to cereals expanded by the explosion process.

The present invention is in part a continuation of my copending application Serial No. 116,116, filed December 16, 1936.

One of the objects of the present invention is to provide an improved method of exploding bran coated and tegumented cereal kernels to produce a product of markedly increased bulk when compared to the products of prior explosion processes.

A further object is to provide an improved method of exploding cereal kernels, which to a large extent results in the separation and removal of the germ from the exploded kernel.

Another object is to prevent agglomeration of the individual particles of cereal, as a result of the explosion treatment.

A still further object is to tenderize the product during the explosion treatment of cereals.

Another object is to provide a method of exploding cereal kernels to obtain a greatly expanded kernel, the tegument of which is broken and separated into relatively small, uniformly distributed particles adhering to the surface thereof.

A more particular object is to produce an exploded corn product of greatly increased bulk when compared to the products of prior explosion processes.

Other objects will become apparent as the invention is hereinafter more fully described.

The foregoing and other objects may be accomplished in accordance with the present invention, one aspect of which comprises, as an improvement in the process of exploding cereal kernels having bran coatings or integuments, the step of treating the kernels with a bran-modifying or bran-softening agent or chemical. This step of modifying or weakening the integument is carried out prior to the instant at which the gas pressure is suddenly released in the explosion process, and most conveniently and satisfactorily is accomplished while the kernels are being subjected to heat and gas pressure.

When the gas pressure is suddenly released, apparently as a result of the weakened condition of the integument, the kernels expand to a much greater bulk than that attained in prior explosion processes. Furthermore, for reasons at present not fully understood, the integument is broken up into minute, uniformly distributed particles adhering to the surface of the expanded product.

In addition, where corn is subjected to the process of the present invention, the germ is separated or removed from most, if not all, of the kernels.

The bran-modifying or softening agent in accordance with the present invention may be selected from a large number of materials. Thus, I may employ (a) certain organic compounds such as the hydroxy compounds, for example, glycerine, sugar, and the like; or (b) certain organo-metallic compounds, such as the salts of organic acids, for example, sodium acetate and the like. Preferably, however, I employ (c) certain inorganic agents of the salt type, such as the alkali metal and alkaline earth metal salts of the mineral acids, for example, a halide of a metal selected from the group consisting of the alkali metals and the alkaline earth metals. As specific examples of the agents which may be used in accordance with the present invention, mention may be made of the following compounds: sodium chloride, sodium sulfate, sodium phosphate, potassium chloride, potassium sulfate, calcium chloride, and the like. Where the exploded product is to be used as a food, bran-modifying agents which are deleterious to health or which render the product unpalatable, should of course be avoided. For this reason, and also because of its cheapness and effectiveness, ordinary table salt (sodium chloride) is the preferred agent in accordance with the present invention. Many other compounds, however, may be used, if desired, in place of those mentioned and these equivalents will be readily apparent to those skilled in the art.

The amount of bran- or integument-modifying agent which may be used in accordance with the present invention will vary, depending on the nature, age, moisture content, etc., of the particular cereal being exploded; the conditions of the treatment; the effectiveness of the particular agent selected, and other factors. Generally speaking, however, the amount required to produce desirable results will be in excess of that which would be used for seasoning the unexploded cereal. In most cases, it will be found desirable to employ salt to the extent of about 3% to about 15% of the weight of the cereal undergoing treatment. Higher amounts in certain cases may be found desirable, but in most instances it appears that amounts in excess of 15% probably afford no particular advantage.

Although the amount of integument-modifying agent required in accordance with the present invention is usually in excess of that which would be employed for seasoning purposes, it does not follow that the product of my improved explosion process contains an unpalatable amount of salt when this is employed as the modifying agent, inasmuch as much of the salt is blown off during the explosion step.

According to one method of carrying out the process of the present invention, the cereal kernels are placed in a gas-pressure chamber, such as the usual cereal "gun." The modifying agent (e. g., solid sodium chloride) is poured in on top of the cereal, or preferably is poured into the chamber simultaneously as the cereal flows into the vessel, in order to obtain a more uniform distribution of the agent throughout the body of the cereal. The cereal gun is then closed and the contents are subjected to heat and gas pressure in the customary manner, if desired. I prefer, however, to employ steam diffused under pressure of more than 100 pounds per square inch (for example, 175 to 225 pounds per square inch), and superheated preferably 180° to 330° F., but any degree of superheat may be used. When using superheated steam of this character, care should be taken to diffuse the steam in order to avoid burning of the grain and decomposition of the fat therein contained.

The exposure to the action of the steam preferably should take place in the absence of air, the vessel being provided, for example, with a small orifice through which the air may be expelled as the steam is admitted. Steam is rapidly introduced into the vessel, the pressure being brought up to the maximum within a few seconds, and the pressure is then held at the maximum for a period usually not exceeding five minutes, 45 to 100 seconds generally being satisfactory. (During this period the pressure in the chamber is maintained approximately constant.) At the end of this time the gun is suddenly opened, so that the grains are violently expelled and simultaneously expanded.

The time of treatment, and the temperature, pressure, and degree of superheating of the steam depend to considerable extent on the moisture content of the original cereal and the texture or degree of expansion which is desired in the treated cereal. Where the moisture content is great, a relatively high degree of superheating and a relatively short time of treatment are satisfactory. If, however, the moisture content is low, a lesser degree of superheating and a longer time of treatment may be desirable. In general, higher pressures will result in a greater degree of expansion in the finished product.

In order more clearly to describe the nature of the present invention, a specific example will hereinafter be described in considerable detail. It should be understood, however, that this is done solely by way of example and merely for the purpose of enabling those skilled in the art to carry out my invention.

Example

In carrying out my investigations, it so happened that I employed the improved cereal gun described and claimed in my copending application Serial No. 757,965, filed December 17, 1934. This particular gun, however, is by no means essential for the purpose of the present invention, inasmuch as any suitable pressure vessel such as the ordinary cereal gun may be used if desired.

With the particular gun employed, approximately 88 ounces of cereal kernels (such as Argentine corn, South American popcorn, Dent corn, pearl hominy, and the like) was found a satisfactory quantity for one shot. A weighed amount of integument-modifying agent, and a weighed quantity of cereal were simultaneously poured into the chamber, so that a fairly uniform distribution of the reagent was obtained.

The gun was then closed, and superheated steam at a pressure of about 175 pounds per square inch, and at a temperature of about 550° F. was then introduced into the gun, the steam treatment being continued for about 100 seconds. The steam was then turned off, and the gun was immediately shot. The product was collected and the bulk was roughly determined by measuring its weight and approximate volume when placed without packing in an open container.

Control tests were carried out under conditions substantially identical with those described above, except that the integument-modifying agent was not used.

Typical, approximate, comparative results obtained with South American popcorn and Argentine corn with various amounts of sodium chloride as the agent, are shown in the table.

Table

| Cereal | Amount of reagent per 88 oz. cereal | Percent increase in bulk | |
|---|---|---|---|
| | | Compared to unexploded cereal | Compared to control |
| | Ounces | Per cent | Per cent |
| South American popcorn | 3 | 1370 | 51 |
| Do | 6 | 1730 | 83 |
| Do | 9 | 1730 | 83 |
| Do | 12 | 1730 | 83 |
| Argentine corn | 3 | 990 | 30 |
| Do | 6 | 1290 | 65 |
| Do | 9 | 1510 | 92 |
| Do | 12 | 1770 | 123 |

The product obtained in accordance with the present invention is characterized by uniformly distributed minute particles of integument adhering to the surface of the exploded kernel. The product generally has an attractive golden brown to golden yellowish brown color. Comparable results were realized with the other cereals tested.

Considerable variation in bulk was noted in successive shots, due to the many variables such as moisture content and age of the cereal, variations in random packing during measurement of the bulk and other factors which were difficult to control. Consequently, the data given in the table are approximate, or average results which are indicative of the trend over a large number of shots.

Certain of the unexpected results attained by my invention may be seen at a glance by reference to the accompanying Figures 1 to 12, which are approximately full size photographic reproductions showing various treated and untreated cereal grains.

Figs. 1, 2, and 3 are views respectively of raw natural kernels of Argentine corn, kernels of the same cereal exploded by the control process, and kernels of the same cereal exploded by my improved process, using table salt as the agent.

Figs. 4, 5, and 6 are views respectively of raw natural kernels of South American popcorn, kernels of the same cereal exploded by the control process, and kernels of the same cereal exploded by my process.

Figs. 7, 8, and 9 are views respectively of raw natural kernels of Dent corn, kernels of the same cereal exploded by the control process, and kernels of the same cereal exploded according to my improved process.

Figs. 10, 11, and 12 are views respectively of fragments of unexploded pearl hominy, fragments of the same material exploded by the control process, and fragments of the same product exploded according to my process.

In Figs. 1, 4, 7, and 10, 1 represents the bran tegument on the unexploded kernels 2. In Figs. 2, 5, 8, and 11, 3 represents the flakes of bran tegument partially adhering to the kernels 4 which have been exploded by the control method, and 5 represents the germ attached to the kernel 4. In Figs. 3, 6, 9, and 12, 6 represents the minute, uniformly distributed particles of bran tegument adhering to the substantially germ-free kernel 7, which has been exploded in accordance with the present invention.

I am aware that the use of table salt has been employed heretofore as a condiment in the preparation of farinaceous compositions which are somewhat expanded by a toasting operation. So far as I am aware, however, no one heretofore has contemplated the process of exploding cereal kernels having bran teguments which have been subjected to the action of a bran-modifying agent.

In the foregoing detailed description of the present invention it will be apparent that many variations may be made without departing from the spirit or scope thereof. Thus, for example, although I have described the use of certain bran-modifying agents in the solid state, solutions thereof may be utilized if desired. Other variations will be apparent to anyone skilled in the art. I therefore intend to be restricted only in accordance with the following patent claims.

I claim:

1. The process of exploding cereal kernels having bran teguments which comprises subjecting the kernels to heat and gas pressure in the presence of a salt, and suddenly releasing the gas pressure.

2. The process of claim 1 wherein said salt is sodium chloride.

3. In the explosion process of expanding cereal kernels having bran teguments, the improvement which comprises subjecting said kernels, in the presence of a salt, to the action of superheated steam at a pressure in excess of about 100 pounds per square inch, continuing said steam treatment for a period not exceeding about five minutes, and thereafter suddenly reducing the gas pressure on said kernels.

4. In the explosion process of expanding corn cereal by subjecting corn cereal to heat and gas pressure and suddenly reducing the gas pressure, the improvement which includes the step of treating said cereal, prior to the reduction of gas pressure, with a bran modifying agent comprising a salt.

5. A cereal product, comprising exploded cereal kernels characterized by minute particles of bran tegument adhering to the surface of said kernels.

6. A corn product comprising substantially germ-free exploded cereal kernels characterized by minute particles of bran teguments adhering to the surface of said kernels.

7. In the explosion process of expanding cereal kernels by subjecting said kernels to heat and gas pressure and thereafter suddenly reducing the gas pressure, the improvement which comprises treating said kernels prior to the reduction of the gas pressure with a salt.

8. The process of exploding hominy which comprises subjecting kernels thereof to heat and gas pressure in the presence of a salt, and suddenly reducing the gas pressure.

9. The process of claim 8 wherein said hominy comprises pearl hominy.

10. A cereal product comprising exploded hominy characterized by minute particles of tegument adhering to the surface thereof.

WILLIAM J. PLEWS.